US011377521B2

(12) United States Patent
Odle et al.

(10) Patent No.: US 11,377,521 B2
(45) Date of Patent: Jul. 5, 2022

(54) LINEAR AND BRANCHED POLYIMIDE COMPOSITION

(71) Applicant: SABIC GLOBAL TECHNOLOGIES B.V., Bergen op Zoom (NL)

(72) Inventors: Roy Ray Odle, Mt. Vernon, IN (US); Peter Johnson, Mt. Vernon, IN (US); Manojkumar Chellamuthu, Mt. Vernon, IN (US); Hee Won Kong, Mt. Vernon, IN (US); Timothy Edward Long, Blacksburg, VA (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/472,143

(22) PCT Filed: Dec. 29, 2017

(86) PCT No.: PCT/US2017/068984
§ 371 (c)(1),
(2) Date: Jun. 20, 2019

(87) PCT Pub. No.: WO2018/126154
PCT Pub. Date: Jul. 5, 2018

(65) Prior Publication Data
US 2019/0315963 A1 Oct. 17, 2019

Related U.S. Application Data

(60) Provisional application No. 62/441,226, filed on Dec. 31, 2016.

(51) Int. Cl.
*C08G 73/10* (2006.01)
*C08L 79/08* (2006.01)
*C08G 73/12* (2006.01)

(52) U.S. Cl.
CPC ....... *C08G 73/1071* (2013.01); *C08G 73/101* (2013.01); *C08G 73/1007* (2013.01); *C08G 73/1046* (2013.01); *C08G 73/122* (2013.01); *C08L 79/08* (2013.01); *C08L 2203/12* (2013.01); *C08L 2203/14* (2013.01); *C08L 2205/025* (2013.01); *C08L 2205/03* (2013.01)

(58) Field of Classification Search
CPC .............................................. C08L 2205/025
See application file for complete search history.

(56) References Cited

U.S. PATENT DOCUMENTS

| 4,433,131 | A | 2/1984 | Bolon et al. |
| 4,980,389 | A | 12/1990 | Hill et al. |
| 6,262,223 | B1 | 7/2001 | Meador et al. |
| 8,546,614 | B1 | 10/2013 | Tan et al. |
| 8,962,890 | B1 | 2/2015 | Tan et al. |
| 2007/0299188 | A1 | 12/2007 | Chan et al. |
| 2010/0316877 | A1 | 12/2010 | Song et al. |
| 2014/0094535 | A1 | 4/2014 | Guggenheim et al. |
| 2017/0121483 | A1 | 5/2017 | Poe et al. |

FOREIGN PATENT DOCUMENTS

| CN | 103059298 A | 4/2013 |
| CN | 104039867 A | 9/2014 |
| CN | 104204036 A | 12/2014 |
| CN | 105085913 A | 11/2015 |
| CN | 106009017 A | 10/2016 |
| JP | 2014114328 A1 | 6/2014 |
| JP | 2015108062 A | 6/2015 |
| WO | 2012133744 A1 | 10/2012 |

OTHER PUBLICATIONS

He et al., "Preparation of Novel, High Modulus, Swollen- or Jungle-Gym-Type Polyimide Gels End-Crosslinked with 1, 3, 5-Tris(4-aminophenyl) Benzene," Journal of Polymer Science: Part A: Polymer Chemistry, vol. 40, 2501-2512 (2002); 12 pages.
International Preliminary Report on Patentability; International Application No. PCT/US2017/068966; International Filing Date—Dec. 29, 2017; dated Apr. 12, 2019; 27 pages.
International Preliminary Report on Patentability; International Application No. PCT/US2017/068984 International Filing Date—Dec. 29, 2017; dated Apr. 10, 2019; 31 pages.
International Preliminary Report on Patentability; International Application No. PCT/US2017/068998; International Filing Date—Dec. 29, 2017; dated Apr. 11, 2019; 30 pages.
International Search Report; International Application No. PCT/US2017/068974; International Filing Date—Dec. 29, 2017; dated Apr. 10, 2018, 6 pages.
Qiu et al., "Synthesis and Characterization of Polyimides from Divalent Metal Salts of p-Aminobenzoic Acid," Journal of Applied Polymer Science, vol. 59, pp. 1437-1442; (1996).
Shiina et al., "Preparation and Properties of Polyimide-Silica Hybrid Films With Conjugation of the Polyimide and Silica by a Sol-Gel Process Using 3-(triethoxysilyl)Propyl Succinic Anhydride," Reactive and Functional Polymers 71 (2011);' pp. 85-94.
Written Opinion; International Application No. PCT/US2017/068974; International Filing Date—Dec. 29, 2017; dated Apr. 10, 2018. 11 pages.
Zeng et al., "Synthesis and Characterization of Polyimides from Metal-Containing (Ba, Sr, Pb, Zn) Diamines," Polymer, vol. 36, No. 19, pp. 3761-3765, (1995).
Zhang et al., "Synthesis and Properties of Branched Sulfonated Polymides for Membranes in Vanadium Redox Flow Battery Application" Electrochimica Acta, 210 (2016); 13 pages.

*Primary Examiner* — Ana L. Woodward
(74) *Attorney, Agent, or Firm* — Cantor Colburn LLP

(57) ABSTRACT

A polyimide composition includes 1 to 99 weight percent, preferably 70 to 99 weight percent, more preferably 75 to 95 weight percent of a first polyimide; and 1 to 99 weight percent, preferably 1 to 30 weight percent, more preferably 2 to 25 weight percent of a second polyimide, wherein the first polyimide and the second polyimide are different, and wherein the polyimide composition has a melt flow rate that is greater than a melt flow rate of the first polyimide and less than a melt flow rate of the second polyimide; an apparent viscosity that is less than an apparent viscosity of the first polyimide and less than an apparent viscosity of the second polyimide; and a notched Izod impact strength that is greater than a notched Izod impact strength of the first polyimide and greater than a notched Izod impact strength of the second polyimide.

20 Claims, No Drawings

LINEAR AND BRANCHED POLYIMIDE COMPOSITION

CROSS REFERENCE TO RELATED APPLICATIONS

This application is a National Stage application of PCT/US2017/068984, filed Dec. 29, 2017, which claims the benefit of U.S. Provisional Patent Application No. 62/441,226, filed Dec. 31, 2016, the entire contents of which are incorporated by reference herein.

BACKGROUND

Polyimides (PIs), and in particular polyetherimides (PEIs), are amorphous, transparent, high performance polymers having a high glass transition temperature. Polyetherimides further have high strength, heat resistance, and modulus, and broad chemical resistance, and thus are widely used in applications as diverse as automotive, telecommunication, aerospace, electrical/electronics, transportation, and healthcare. Moreover, PEIs can be recycled, whereas some PIs are thermosets that cannot be recycled.

An ongoing challenge associated with polyimides and polyetherimides is synthesizing desirable polyimides and polyetherimides having long-chain branches (LCBs). The inclusion of long-chain branches can influence the melt strength of the polymers, and can reduce the melt viscosity of higher molecular weight polymers for a given processing temperature. Furthermore, long-chain branches can improve shear-thinning and extensional flow processing over linear analogues. For instance, the introduction of long-chain branches into polyesters (e.g., poly(ethylene terephthalate)) can improve melt strength and reduce the rate of crystallinity.

Accordingly, there remains a continuing need in the art for polyimides and polyetherimides that have long-chain branches, and for polyimide and polyetherimide compositions including the long-chain branching species that have improved flow properties and desirable mechanical properties.

SUMMARY

A polyimide composition includes 1 to 99 wt %, preferably 70 to 99 wt %, more preferably 75 to 95 wt % of a first polyimide; and 1 to 99 wt %, preferably 1 to 30 wt %, more preferably 2 to 25 wt % of a second polyimide, wherein the first polyimide and the second polyimide are different, and wherein the polyimide composition has a melt flow rate that is greater than a melt flow rate of the first polyimide and greater than a melt flow rate of the second polyimide, each when measured at 337° C. at a shear load of 6.7 kg, in accordance with ASTM 1238; an apparent viscosity that is less than an apparent viscosity of the first polyimide and less than an apparent viscosity of the second polyimide, each when measured at 380° C. at a shear rate of 640 inverse seconds, in accordance with ISO 11443; and a notched Izod impact strength that is greater than at least one of a notched Izod impact strength of the first polyimide or a notched Izod impact strength of the second polyimide, each when measured at 23° C. in accordance with ASTM D256.

A method for the manufacture of the second polyimide includes reacting a polyamine of the formula

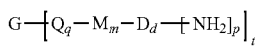

and a diamine of the formula

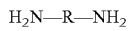

with a dianhydride of the formula

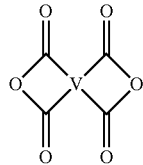

in a solvent and under conditions effective to provide the second polyimide, wherein G, Q, M, D, R, V, q, m, d, p, and t are as defined herein.

A method for the manufacture of the second polyimide, wherein the second polyimide is a polyetherimide, includes reacting a polyamine of the formula

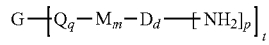

and a diamine of the formula

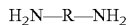

with an anhydride of the formula

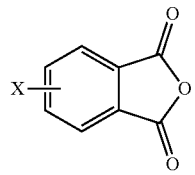

wherein X is a nitro group or halogen, to provide intermediate bis(phthalimide)s of the formulas

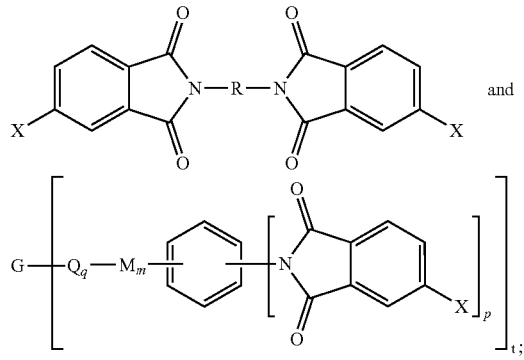

and reacting the bis(phthalimide)s with an alkali metal salt of a dihydroxy aromatic compound having the formula

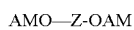

wherein AM is an alkali metal, to provide the branched polyetherimide, wherein G, Q, M, D, R, V, Z, q, m, d, p, and t are as defined herein.

A method for the manufacture of the polyimide composition can include melt processing the first polyimide and the second polyimide.

A polymer composition includes polyimide composition an additional polymer different from the first polyimide and second polyimide.

An article includes the polyimide composition or the polymer composition.

A method for the manufacture of a film includes solution-casting or melt processing the polyimide composition or the polymer composition.

The above described and other features are exemplified by the following detailed description.

DETAILED DESCRIPTION

The inventors hereof have discovered that the synthesis of poly-functional aryl amines (polyamines), and subsequent polymerization with a dianhydride and a diamine, provides long chain branched polyimides (LCB-PIs) and polyetherimides (LCB-PEIs). Compositions including a branched PI or PEI and a linear PI or PEI provided polyimide compositions with improved properties. Applicants discovered that the improved flow properties of the branched PEIs were imparted to the PEI composition, while the desirable mechanical properties of the linear PEIs were maintained. These results showed a synergistic interaction between the PEIs in the blend, because the resulting properties were surprisingly better than expected from the aggregate properties of the individual PEI components.

Such properties are especially useful in the manufacture of thin-wall parts, where high-flow properties, especially low melt viscosity under the high shear conditions are important in injection molding. The blends of branched and linear PIs can satisfy this criterion and fare better than the linear PI of the same molecular weight. The blend of branched and linear PIs can be combined with additional thermoplastics to provide useful thermoplastic compositions.

The polyimide composition includes 1 to 99 weight percent (wt %), preferably 70 to 99 wt %, more preferably 75 to 95 wt % of a first polyimide; and 1 to 99 wt %, preferably 1 to 30 wt %, more preferably 2 to 25 wt % of a second polyimide. In some embodiments, the ratio of first polyimide to second polyimide is 99:1 to 1:99, or 9:1 to 1:9, or 5:1 to 1:5, or 4:1 to 1:4, or 3:1 to 1:3, or 65:35 to 35:65, or 2:1 to 1:2.

The first polyimide is different from the second polyimide. For example, the first polyimide is a linear polyimide and the second polyimide is a long chain branched polyimide. In an embodiment, the first polyimide is a linear polyetherimide and the second polyimide is a long chain branched polyetherimide The polyimide composition has a melt flow rate that is greater than a melt flow rate of the first polyimide and greater than a melt flow rate of the second polyimide, each when measured at 337° C. at a shear load of 6.7 kg, in accordance with ASTM 1238. In an embodiment, the polyimide composition has a melt flow rate of at least 19 grams per 10 minutes (g/10 min), preferably at least 20 g/10 min, more preferably at least 21 g/10 min, when measured at 337° C. at a shear load of 6.7 kg, in accordance with ASTM 1238. In particular embodiments, the polyimide composition has a melt from rate of 19 to 50 g/10 min, or 20 to 50 g/10 min, or 25 to 50 g/10 min, or 30 to 50 g/10 min, preferably 20 to 40 g/10 min, or 20 to 30 g/10 min, more preferably 21 to 50 g/10 min, or 21 to 40 g/10 min, or 21 to 30 g/10 min, or 22 to 50 g/10 min, or 22 to 40 g/10 min, or 22 to 30 g/10 min, or 23 to 50 g/10 min, or 23 to 40 g/10 min, or 23 to 30 g/10 min, or 24 to 50 g/10 min, or 24 to 40 g/10 min, or 24 to 30 g/10 min, or 25 to 50 g/10 min, or 25 to 40 g/10 min, or 25 to 35 g/10 min, or 26 to 50 g/10 min, or 26 to 40 g/10 min, or 26 to 35 g/10 min, or 27 to 50 g/10 min, or 27 to 40 g/10 min, or 27 to 35 g/10 min, or 28 to 50 g/10 min, or 28 to 40 g/10 min, or 29 to 50 g/10 min, or 29 to 40 g/10 min, or 30 to 50 g/10 min, or 30 to 40 g/10 min, each when measured at 337° C. at a shear load of 6.7 kg, in accordance with ASTM 1238.

The polyimide composition has an apparent viscosity that is less than an apparent viscosity of the first polyimide and less than an apparent viscosity of the second polyimide, each when measured at 380° C. at a shear rate of 640 inverse seconds (1/s), in accordance with ISO 11443. In an embodiment, the polyimide composition has an apparent viscosity of less than 330 Pascal second (Pa·s), preferably less than 320 Pa-s, more preferably less than 310 Pa-s when measured at 380° C. at a shear rate of 640 1/s, in accordance with ISO 11443. In particular embodiments, the polyimide composition has an apparent viscosity of 100 to 325 Pa·s, or 150 to 325 Pa·s, or 200 to Pa·s, or 250 to 325 Pa·s, or 100 to 320 Pa·s, or 150 to 320 Pa·s, or 200 to 320 Pa·s, or 250 to 320 Pa·s, or 100 to 310 Pa·s, or 150 to 310 Pa·s, or 200 to 310 Pa·s, or 250 to 310 Pa-s, or 100 to 300 Pa·s, or 150 to 300 Pa·s, or 200 to 300 Pa·s, or 250 to 300 Pa·s, each when measured at 380° C. at a shear rate of 640 1/s, in accordance with ISO 11443.

The polyimide composition has a notched Izod impact strength that is greater than at least one of a notched Izod impact strength of the first polyimide or a notched Izod impact strength of the second polyimide, each when measured at 23° C. and 6.78 Newton-meter (N·m, or 5 pounds per foot) of pendulum force, in accordance with ASTM D256. In an embodiment, the polyimide composition has a notched Izod impact strength of at least 30 Joules per meter (J/m), preferably at least 31 J/m, more preferably at least 32 J/m, when measured at 23° C. and 6.78 N·m, in accordance with ASTM D256. In particular embodiments, the polyimide composition has a notched Izod impact strength of 30 to 60 J/m, or 30 to 55 J/m, or 30 to 50 J/m, or 30 to 45 J/m, or 30 to 40 J/m, or 31 to 60 J/m, or 31 to 55 J/m, or 31 to 50 J/m, or 31 to 45 J/m, or 31 to 40 J/m, or 32 to 60 J/m, or 32 to 55 J/m, or 32 to 50 J/m, or 32 to 45 J/m, or 32 to 40 J/m, or 33 to 60 J/m, or 33 to 55 J/m, or 33 to 50 J/m, or 33 to 45 J/m, or 33 to 40 J/m, or 34 to 60 J/m, or 34 to 55 J/m, or 34 to 50 J/m, or 34 to 45 J/m, or 34 to 40 J/m, or 35 to 60 J/m, or 35 to 55 J/m, or 35 to 50 J/m, or 35 to 45 J/m, or 36 to 60 J/m, or 36 to 55 J/m, or 36 to 50 J/m, or 36 to 45 J/m, or 37 to 60 J/m, or 37 to 55 J/m, or 37 to 50 J/m, or 37 to 45 J/m, when measured at 23° C. and 6.78 N·m, in accordance with ASTM D256.

In some embodiments, the polyimide composition has an unnotched Izod impact strength of at least 1,100 J/m, preferably at least 1,200 J/m, more preferably at least 1,300 J/m, when measured at 23° C. and 6.78 N-m of pendulum force, in accordance with ASTM D256. For example, the polyimide composition can have an unnotched Izod impact strength of 1,110 to 1,600 J/m, or 1,100 to 1,500 J/m, or 1,100 to 1,400 J/m, or 1,100 to 1,300 J/m, or 1,100 to 1,200 J/m, or 1,200 to 1,600 J/m, or 1,200 to 1,500 J/m, or 1,200 to 1,400 J/m, or 1,200 to 1,300 J/m, or 1,300 to 1,600 J/m, or 1,300 to 1,500 J/m, or 1,300 to 1,400 J/m, or 1,400 to 1,600 J/m, or 1,400 to 1,500 J/m, or 1,500 to 1,600 J/m, or 1,550 to 1,650 J/m, or 1,500 to 1,700 J/m, when measured at 23° C. and 6.78 N·m, in accordance with ASTM D256.

In certain embodiments, the polyimide composition has a reverse notched Izod impact strength of at least 850 J/m, preferably at least 875 J/m, more preferably at least 900 J/m, when measured at 23° C. and 6.78 N·m of pendulum force, in accordance with ASTM D256. In particular embodiments, the polyimide composition has a reverse notched Izod impact strength of 850 to 1,250 J/m, or 850 to 1,150 J/m, or 850 to 1,050 J/m, or 850 to 950 J/m, or 875 to 1,250 J/m, or 875 to 1,150 J/m, or 875 to 1,050 J/m, or 875 to 975 J/m, or 900 to 1,300 J/m, or 900 to 1,200 J/m, or 900 to 1,100 J/m, or 900 to 1,000 J/m, or 950 to 1,400 J/m, or 950 to 1,300 J/m, or 950 to 1,200 J/m, or 950 to 1,100 J/m, or 950 to 1,050 J/m, when measured at 23° C. and 6.78 N-m, in accordance with ASTM D256.

The polyimide composition can have a glass transition temperature ($T_g$) that is greater than 100° C., preferably greater than 200° C., more preferably greater than 210° C., even more preferably greater than 215° C. In particular embodiments, the polyimide composition has a $T_g$ of 100 to 395° C., or 150 to 395° C., or 175 to 395° C., or 190 to 395° C., or 200 to 395° C., or 210 to 385° C., or 215 to 385° C., or 200 to 375° C., or 210 to 375° C., or 215 to 375° C., or 200 to 365° C., or 210 to 365° C., or 215 to 365° C., or 200 to 350° C., or 210 to 350° C., or 215 to 350° C., or 200 to 325° C., or 210 to 325° C., or 215 to 325° C., or 200 to 315° C., or 210 to 315° C., or 215 to 315° C., or 200 to 305° C., or 210 to 305° C., or 215 to 305° C., or 200 to 295° C., or 210 to 295° C., or 215 to 295° C., or 200 to 285° C., or 210 to 285° C., or 215 to 285° C., or 200 to 275° C., or 210 to 275° C., or 215 to 275° C., or 200 to 260° C., or 210 to 260° C., or 215 to 260° C., or 200 to 250° C., or 200 to 245° C., or 200 to 240° C., or 200 to 235° C., or 200 to 230° C., or 200 to 225° C., or 200 to 220° C., or 210 to 250° C., or 210 to 245° C., or 210 to 240° C., or 210 to 235° C., or 210 to 230° C., or 210 to 225° C., or 210 to 220° C., or 215 to 250° C., or 215 to 245° C., or 215 to 240° C., or 215 to 235° C., or 215 to 230° C., or 215 to 225° C., or 220 to 250° C., or 220 to 250° C., or 220 to 245° C., or 220 to 240° C., or 220 to 235° C., or 220 to 230° C.

The polyimide composition can have a viscosity change of less than 60%, preferably less than 30%, more preferably less than 25% after 1,800 seconds (s) at a temperature of 400° C. at a shear rate of 640 1/s. In certain embodiments, the polyimide composition has a viscosity change of 10 to 60%, or 20 to 60%, or 30 to 60%, or 40 to 60%, or 10 to 50%, or 20 to 50%, or 20 to 40%, or 5 to 30%, or 10 to 30%, or 15 to 30%, or 20 to 30%, or 5 to 25%, or 10 to 25%, or 15 to 25%, or 5 to 20%, or 10 to 20% after 1,800 s at a temperature of 400° C. at a shear rate of 640 1/s.

The polyimide composition can have a tensile elongation at break of greater than 20%, preferably greater than 25%, more preferably greater than 30% at a temperature of 23° C. when measured in accordance with ASTM D638. In some embodiments, the polyimide composition has a tensile elongation at break of 20 to 60%, or 20 to 50%, or 20 to 40%, or 20 to 30%, or 25 to 60%, or 25 to 50%, or 25 to 40%, or 25 to 35%, or 30 to 60%, or 30 to 50%, or 30 to 45%, or 30 to 40%, or 35 to 60%, or 40 to 60%, or 50 to 60%, at a temperature of 23° C. when measured in accordance with ASTM D638.

The first polyimide can have a weight average molecular weight ($M_w$) of 28,000 to 60,000 grams per mole (g/mol), preferably 30,000 to 50,000 g/mol, more preferably 32,000 to 45,000 g/mol, as determined by triple point detection. In some embodiments, the first polyimide has a $M_w$ of 29,000 to 55,000 g/mol, or 29,000 to 52,000 g/mol 29,000 to 48,000 g/mol, or 30,000 to 47,000 g/mol, or 30,000 to 45,000 g/mol, or 31,000 to 45,000 g/mol, or 32,000 to 43,000 g/mol, or 33,000 to 41,000 g/mol, or 34,000 to 40,000 g/mol, or 28,000 to 40,000 g/mol, or 29,000 to 39,000 g/mol, or 28,000 to 38,000 g/mol, or 28,000 to 35,000 g/mol, or 30,000 to 40,000 g/mol, or 30,000 to 38,000 g/mol, as determined by triple point detection.

The second polyimide can have a $M_w$ of 32,000 to 60,000 g/mol, preferably 34,000 to 54,000 g/mol, more preferably 36,000 to 46,000 g/mol, as determined by triple point detection. In some embodiments, the second polyimide has a $M_w$ of 32,000 to 55,000 g/mol, or 32,000 to 55,000 g/mol, or 32,000 to 50,000 g/mol, or 33,000 to 45,000 g/mol, or 34,000 to 44,000 g/mol, or 35,000 to 43,000 g/mol, or 36,000 to 42,000 g/mol, or 32,000 to 40,000 g/mol, or 33,000 to 39,000 g/mol, or 34,000 to 38,000 g/mol, or 34,000 to 44,000 g/mol, or 35,000 to 43,000 g/mol, or 36,000 to 42,000 g/mol, or 37,000 to 41,000 g/mol, or 36,000 to 45,000 g/mol, or 37,000 to 45,000 g/mol, or 38,000 to 44,000 g/mol, or 39,000 to 43,000 g/mol, as determined by triple point detection.

In some embodiments, the polydispersity index (PDI) of the first polyimide is less than the polydispersity index of the second polyimide. In particular embodiments, the first polyimide has a PDI of 1.8 to 2.4, preferably 1.9 to 2.2, more preferably 2 to 2.2, and the second polyimide has a PDI of 2.3 to 3.5, preferably 2.4 to 3.2, more preferably 2.5 to 3.

In still other embodiments, the PDI of the first polyimide is 1.8 to 2.3, or 1.8 to 2.2, or 1.8 to 2.1, or 1.9 to 2.4, or 1.9 to 2.3, or 1.9 to 2.2, or 1.9 to 2.1, or 2 to 2.4, or 2 to 2.3, or 2 to 2.2, or 2 to 2.1, or 2.1 to 2.4, or 2.1 to 2.3, or 2.1 to 2.2.

In certain embodiments, the second polyimide has a PDI of 2.3 to 3.4, or 2.3 to 3.3, or 2.4 to 3.5, or 2.4 to 3.4, or 2.4 to 3.3, or 2.4 to 3.2, or 2.4 to 3.1, or 2.4 to 3, or 2.5 to 3.5, or 2.5 to 3.4, or 2.5 to 3.3, or 2.5 to 3.2, or 2.5 to 3.1, or 2.5 to 3, or 2.6 to 3.5, or 2.6 to 3.4, or 2.6 to 3.3, or 2.6 to 3.1, or 2.6 to 3, or 2.7 to 3.5, or 2.7 to 3.4, or 2.7 to 3.3, or 2.7 to 3.2, or 2.7 to 3.1, or 2.7 to 3, or 2.8 to 3.5, or 2.8 to 3.4, or 2.8 to 3.3, or 2.8 to 3.2, or 2.8 to 3.1, or 2.8 to 3, or 2.9 to 3.5, or 2.9 to 3.4, or 2.9 to 3.3, or 2.9 to 3.2, or 2.9 to 3.1.

The polyimide composition has a UL94 rating of V-1 or better, as measured following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. In an embodiment, the polyimide composition has a UL94 rating of V-0 or V-1 at a thickness of 0.3, 0.5, 0.75, 0.9, 1, 1.5, 2, or 3 mm. In some embodiments, the polyimide composition has a UL94 rating of V-0 at a thickness of 0.3, 0.5, 0.75, 0.9, 1, 1.5, 2, or 3 mm. In a particular embodiment, the polyimide composition has a UL94 rating of V-0 at a thickness of 0.5 or 1.5 mm.

The second polyimide is of formula (1) or (1')

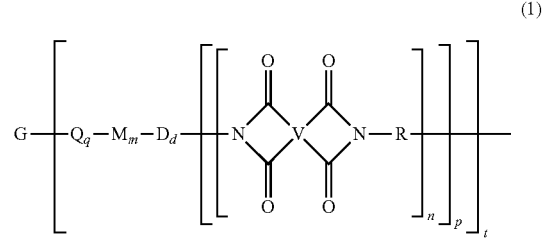

(1)

-continued

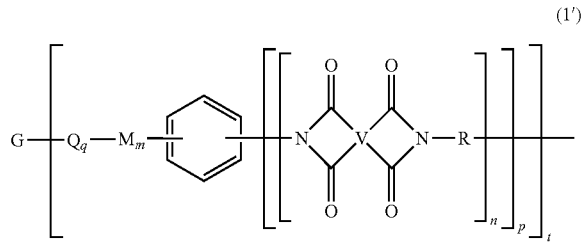
(1')

In formulas (1) and (1'), G is a group having a valence of t, present in an amount 0.1 to 20 mol %, or 0.5 to 10 mol %, or 1.0 to 5 mol %, or 1.5 to 4 mol %, and q is 0 or 1, m is 0 or 1, d is 0 or 1, p is 1 or 2, t is 2 to 6, preferably 2 to 4. In an embodiment, t is 2, and G is —O—, —C(O)—, —OC(O)—, —(O)CO—, —NHC(O), —(O)CNH—, —S—, —S(O)—, —S(O)$_2$—, or —P(R$^a$)(O)— (wherein R$^a$ is a C$_{1-8}$ alkyl or C$_{6-12}$ aryl). In another embodiment, t is 3, and G is nitrogen, phosphorus, or P(O). In still another embodiment, G is a C$_{1-60}$ hydrocarbon group having a valence of t. In a preferred embodiment, G is —O— when m is 0, pentavalent P(O), a C$_{6-50}$ hydrocarbon having at least one aromatic group, for example a C$_{6-40}$ aromatic hydrocarbon group, a C$_{2-20}$ aliphatic group, a C$_{4-8}$ cycloaliphatic group, a C$_{3-12}$ heteroarylene, or a polymer moiety; or G is —O—, —S(O)$_2$—, pentavalent P(O), a C$_{6-20}$ aromatic hydrocarbon group, a C$_{2-20}$ aliphatic group, or a C$_{4-8}$ cycloaliphatic group. In a specific embodiment, G is —O—, pentavalent P(O), or a C$_{6-50}$ hydrocarbon having at least one aromatic group. When q, m, and d are 0, G can be a saturated C$_{2-20}$ aliphatic group, C$_{3-12}$ heteroarylene or a polymeric moiety, for example an amino resin such as a urea-formaldehyde, a melamine-formaldehyde, or other resin having active amine groups.

In formula (1) and (1'), each Q is independently the same or different, and is a divalent C$_{1-60}$ hydrocarbon group. In a preferred embodiment, Q is a C$_{6-20}$ arylene, a C$_{1-20}$ alkylene, or a C$_{3-8}$ cycloalkylene. In a more preferred embodiment, Q is a C$_{6-20}$ arylene.

In formula (1) and (1'), each M is independently the same or different, and is —O—, —C(O)—, —OC(O)—, —OC(O)O—, —NHC(O), —(O)CNH—, —S—, —S(O)—, —S(O)$_2$—. In another embodiment, M is —O—, —C(O)—, —OC(O)—, —P(R$^a$)—, or —P(O)R$^a$—. In an embodiment, M is —O—, —C(O)—, —OC(O)—, —P(R$^a$)—, or —P(O)R$^a$— wherein R$^a$ is a C$_{1-8}$ alkyl or C$_{6-12}$ aryl.

In formula (1) and (1'), each D is phenylene. In an embodiment, each D is the same or different, and is m-phenylene or p-phenylene.

Further in formula (1) and (1'), each V is independently the same or different, and is a tetravalent C$_{4-40}$ hydrocarbon group. In an embodiment, V is a C$_{6-20}$ aromatic hydrocarbon group. Exemplary aromatic hydrocarbon groups include any of those of the formulas (2)

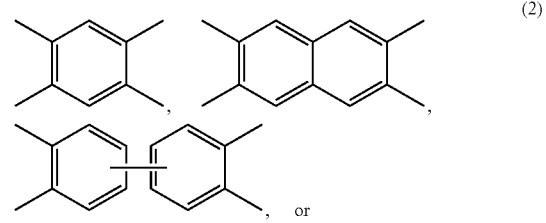
, or

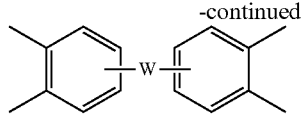

wherein W is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or a group of the formula —O—Z—O— as described in formula (1a) and (1a') below.

Also in formula (1) and (1'), each R is independently the same or different, and is a C$_{1-20}$ divalent hydrocarbon group. Specifically, each R can be the same or different, and is a divalent organic group, such as a C$_{6-20}$ aromatic hydrocarbon group or a halogenated derivative thereof, a straight or branched chain C$_{2-20}$ alkylene group or a halogenated derivative thereof, a C$_{3-8}$ cycloalkylene group or halogenated derivative thereof, in particular a divalent group of any of formulas (3)

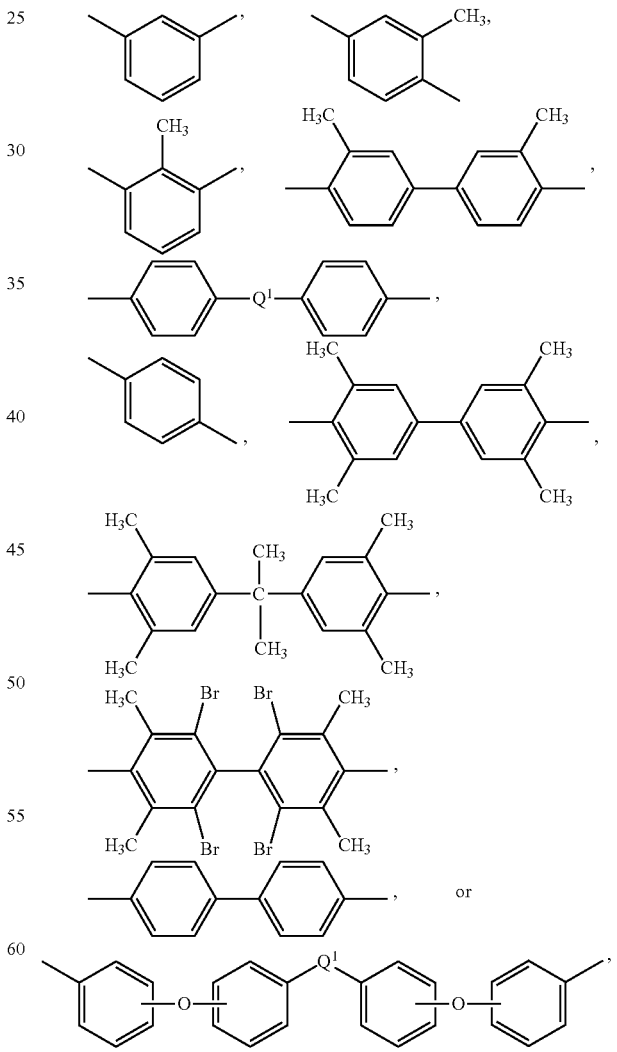

wherein Q$^1$ is —O—, —S—, —C(O)—, —SO$_2$—, —SO—, —P(R$^a$)(=O)— wherein R$^a$ is a C$_{1-8}$ alkyl or C$_{6-12}$ aryl, —$C_yH_{2y}$— wherein y is an integer from 1 to 5 or a halogenated derivative thereof (which includes perfluoroalkylene groups), or —$(C_6H_{10})_z$— wherein z is an integer from 1 to 4. In an embodiment R is m-phenylene, p-phenylene, or a diarylene sulfone.

Still further in formula (1) and (1'), each n is independently the same or different, and is 1 to 1,000, preferably 2 to 500, or 3 to 100, provided that the total of all values of n is greater than 4, preferably greater than 10, more preferably greater than 20, or greater than 50, or greater than 100, or greater than 250, or 4 to 50, or 10 to 50, or 20 to 50, or 4 to 100, or 10 to 100, or 20 to 100.

In certain embodiments, the polyimide composition includes 80 to 98 wt % of the first polyimide, 2 to 20 wt % of the second polyimide, and G is present in an amount 0.1 to 5 mol %.

In other embodiments, the polyimide composition includes 85 to 98 wt % of the first polyimide, 2 to 15 wt % of the second polyimide, and G is present in an amount 0.2 to 4 mol %. In still other embodiments, the polyimide composition includes 89 to 98 wt % of the first polyimide, 2 to 11 wt % of the second polyimide, and G is present in an amount 0.3 to 2 mol %.

In another specific embodiment, the second polyimide of formula (1) or (1') can be a polyetherimide of formula (1a), preferably (1a')

example; p' and q' are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (preferably para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula

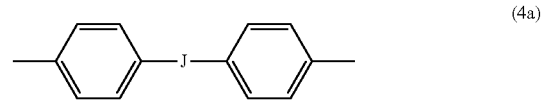

(4a)

wherein J is a single bond, —O—, —S—, —C(O)—, —SO$_2$—, —SO—, or —$C_yH_{2y}$— wherein y is an integer

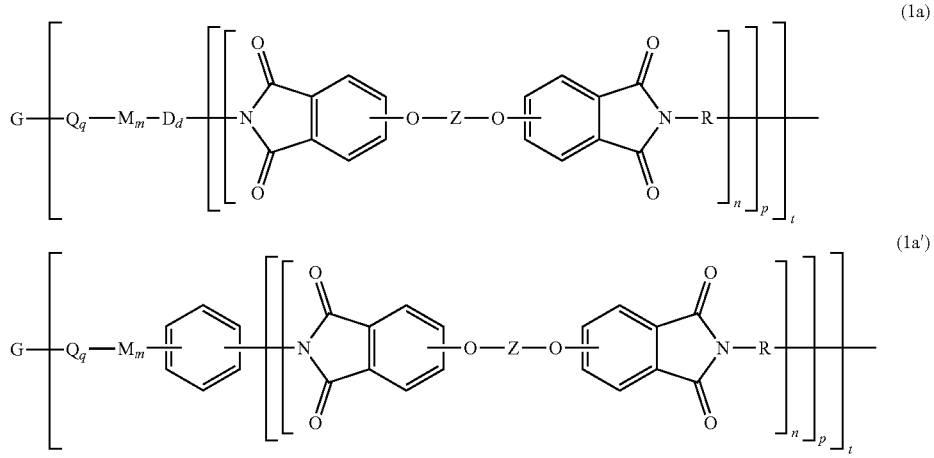

wherein G, Q, M, D, R, q, m, d, n, p, and t are as defined in formula (1) and (1'), and wherein the divalent bonds of the —O—Z—O— group are in the 3,3', 3,4', 4,3', or the 4,4' positions. The group Z in —O—Z—O— of formula (1a) and (1a') is a divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (4)

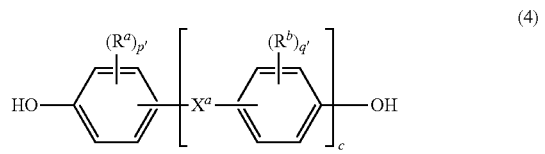

(4)

wherein $R^a$ and $R^b$ can be the same or different and are a halogen atom or a monovalent $C_{1-6}$ alkyl group, for from 1 to 5 or a halogenated derivative thereof (including a perfluoroalkylene group). In a specific embodiment Z is a derived from bisphenol A, such that J in formula (4a) is 2,2-isopropylidene.

In an embodiment in formulas (1), (1'), (1a), and (1a'), R is m-phenylene or p-phenylene, bis(4,4'-phenylene)sulfone, bis(3,4'-phenylene)sulfone, or bis(3,3'-phenylene)sulfone. In this embodiment, Z can be a divalent group of formula (4a). In an alternative embodiment, R is m-phenylene or p-phenylene and Z is a divalent group of formula (4a) and J is 2,2-isopropylidene.

In some embodiments, the second polyimide can be a copolymer, for example a polyetherimide sulfone copolymer comprising structural units of formulas (1), (1'), (1a), or (1a') wherein at least 50 mol % of the R groups are of formula (3) wherein $Q^1$ is —SO$_2$— and the remaining R groups are independently p-phenylene or m-phenylene or a combination thereof; and Z is 2,2'-(4-phenylene)isopropylidene. Alternatively, the polyetherimide copolymer optionally comprises additional structural imide units, for example imide units wherein V is of formula (2a) wherein R and V are as described in formula (2a), for example V is

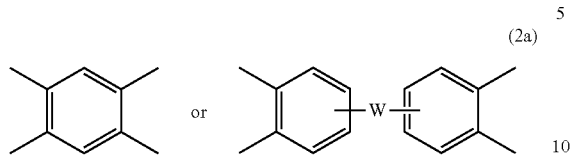
(2a)

wherein W is a single bond, —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (which includes perfluoroalkylene groups). These additional structural imide units can comprise less than 20 mol % of the total number of units, or 0 to 10 mol % of the total number of units, or 0 to 5 mol % of the total number of units, or 0 to 2 mol % of the total number of units. In some embodiments, no additional imide units are present in the second polyimide other than polyetherimide units.

The second polyimide (which as indicated above include polyimides (1) and (1') and the polyetherimides (1a) and (1a')), can be prepared by methods known in the art, including a polycondensation or ether-forming polymerization. In any process, the appropriate amount of a polyamine of formula (5), preferably of formula (5')

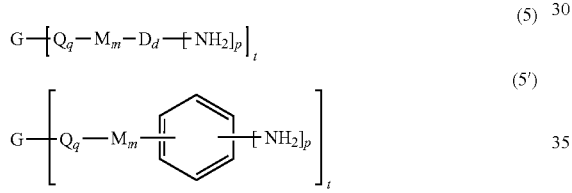
(5)
(5')

is introduced during manufacture of the branched polyimide as described in further detail below. In formula (5) and (5'), G, Q, M, D, q, m, d, p, and t are defined as described in formulas (1), (1'), (1a), and (1a').

Exemplary polyamines (5) and (5') can include any of formulas (5a)-(5t):

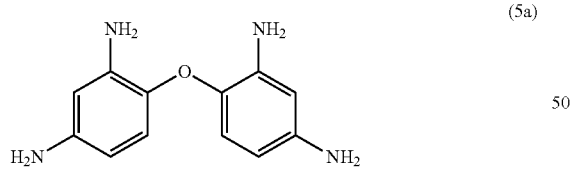
(5a)

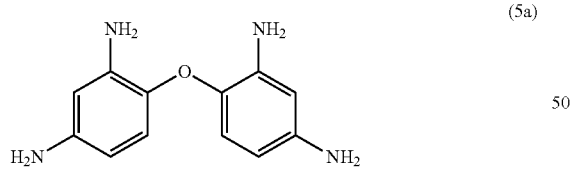
(5b)

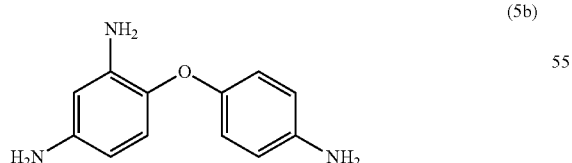
(5c)

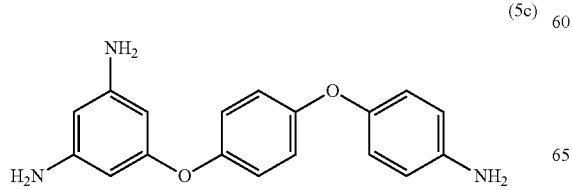

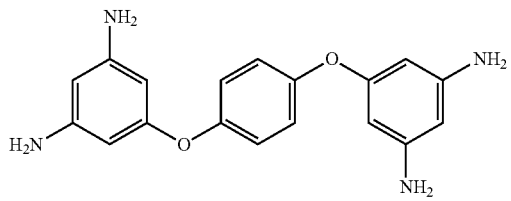
(5d)

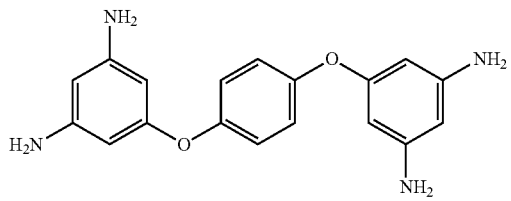
(5e)

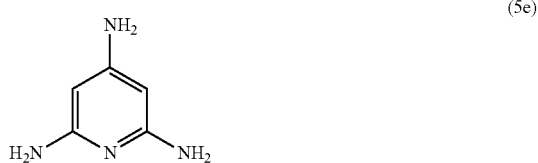
(5f)

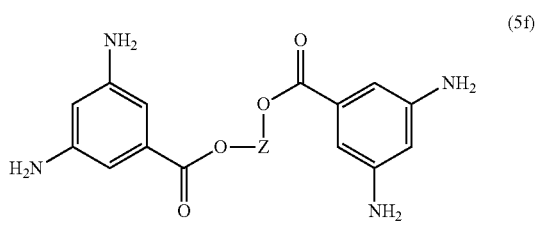
(5g)

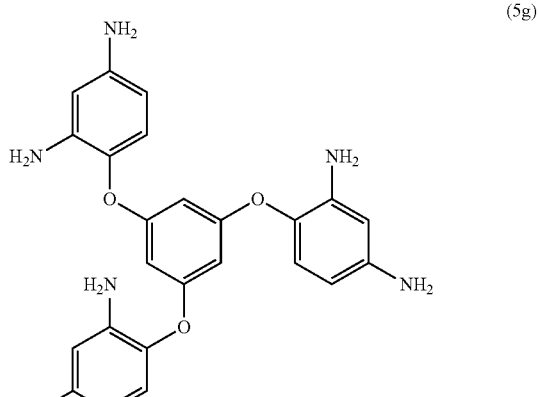

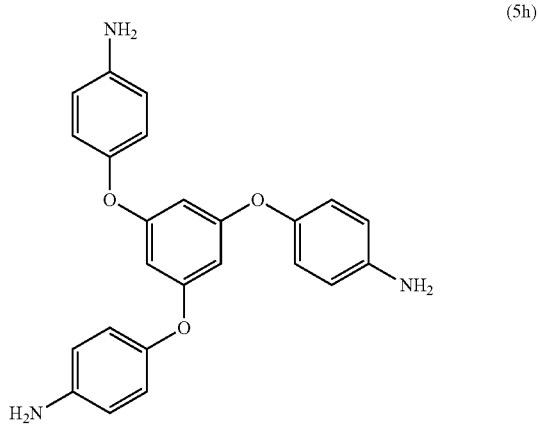
(5h)

-continued
(5i)
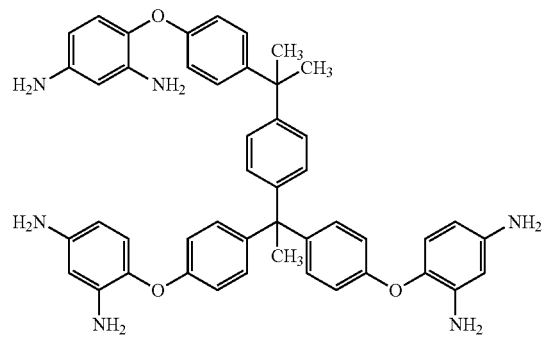
(5j)
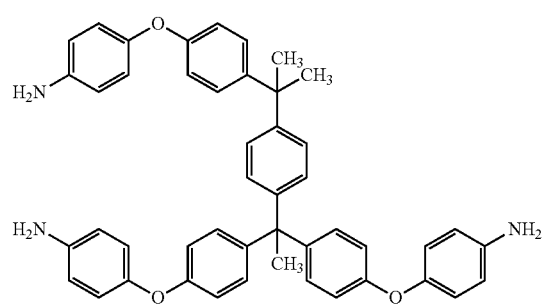
(5k)
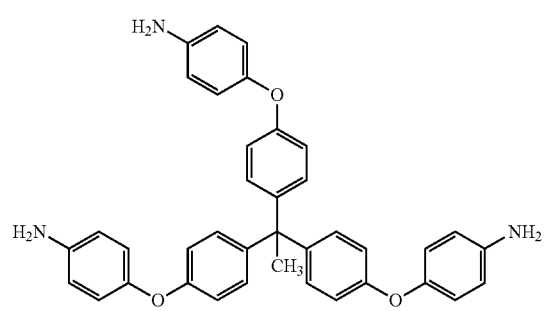
(5l)
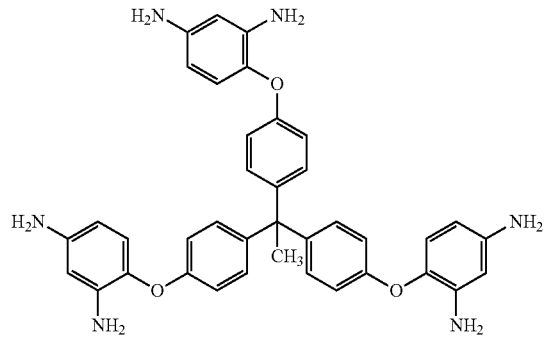
-continued
(5m)
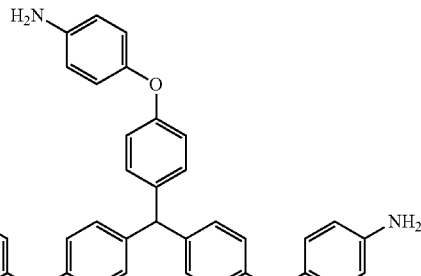
(5n)
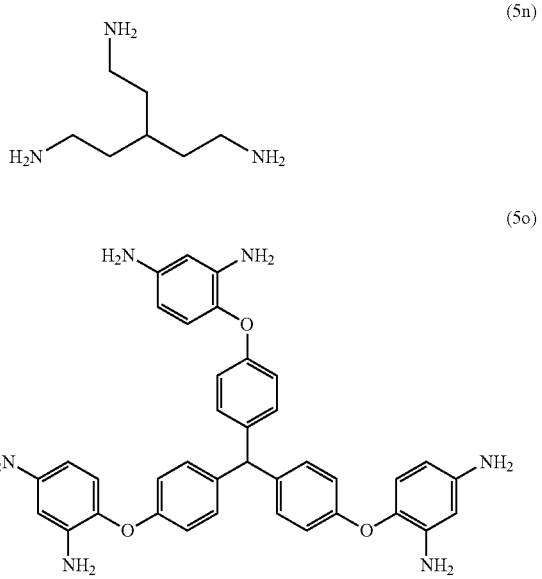
(5o)
(5p)
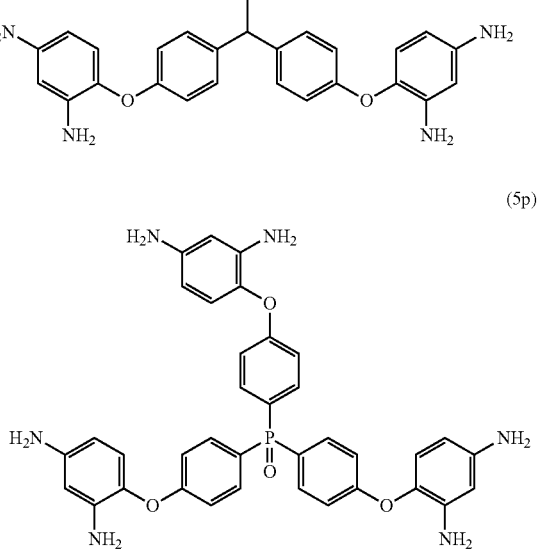
(5q)
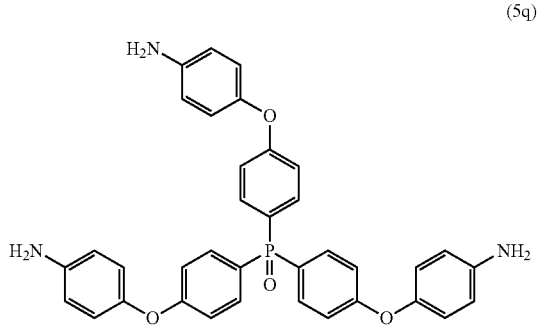

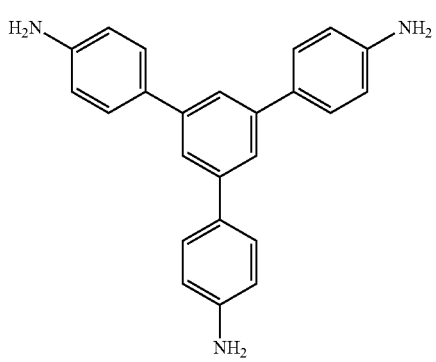

(5r)

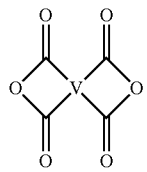

(6)

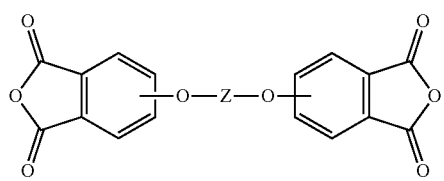

(6a)

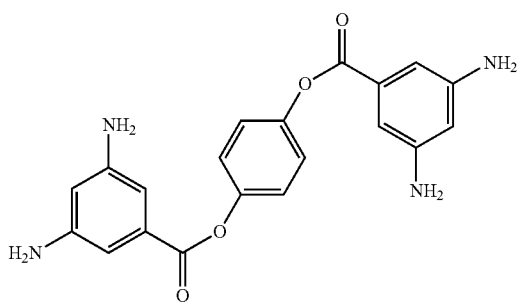

(5s)

(5t)

wherein, in formula (5f), Z is a divalent $C_{1-60}$ hydrocarbon group, or a $C_{6-40}$ aromatic hydrocarbon group, a $C_{2-20}$ aliphatic group, or a $C_{4-8}$ cycloaliphatic group. In a particular embodiment, the polyamine is of the formulas (5b), (5k), (5r), (5s), or (5t), preferably 5(k).

Methods for the synthesis of the polyamines are known in the art. An exemplary method for the synthesis of the polyamine of formulas (5) and (5') uses a two-step sequence. For example, in the first step, a nucleophilic aromatic substitution of a halogenated aromatic nitro compound (e.g., 1-chloro-4-nitrobenzene) with a polyphenol (e.g., 1,1,1-tris (4-hydroxyphenyl) ethane) that is converted to a polyphenoxide in-situ, providing a sufficiently nucleophilic oxygen to displace the activated halide. A polar aprotic solvent (e.g., dimethylacetamide) can promote the substitution reaction to afford a poly(nitrophenyl) compound (e.g., 1,1,1-tris((p-nitrophenoxy)phenyl) ethane). The second step is a reduction of the poly(nitrophenyl) compound to the polyamine of formula (5) using, for example, a palladium catalyst with a reducing agent, an iron-based catalyst, vasicine, zinc, samarium, and hydrazine.

The second polyimide can be prepared by polycondensation, which includes an imidization of a dianhydride of formula (6) or formula (6a)

or a chemical equivalent thereof, with a combination of an organic diamine of formula (7)

$$H_2N-R-NH_2 \qquad (7)$$

and the polyamine of formula (5), preferably of formula (5'), wherein V, Z, R, G, Q, M, D, q, m, d, p, and t are defined as described in formulas (1), (1'), (1a), and (1a'). The polyamine (5), preferably (5') can be present in the reaction in an amount of 0.1 to 20 mol %, or 0.5 to 10 mol %, or 1.0 to 5 mol %, or 1.5 to 4 mol %.

Exemplary dianhydrides (6) or (6a) include 3,3-bis[4-(3,4-dicarboxyphenoxy)phenyl]propane dianhydride; 4,4'-bis (3,4-dicarboxyphenoxy)diphenyl ether dianhydride; 4,4'-bis (3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as various combinations thereof.

Specific examples of organic diamines (7) include hexamethylenediamine, polymethylated 1,6-n-hexanediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4- bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. Combinations of these compounds can also be used. In some embodiments the organic diamine is m-phenylenediamine, p-phenylenediamine, 4,4'-diaminodiphenyl sulfone, or a combination thereof.

In some embodiments, the polycondensation is conducted in the presence of an endcapping agent. Exemplary endcapping agents include, but are not limited to phthalic anhydride, aniline, $C_{1-18}$ linear, branched or cyclic aliphatic monoamines, monofunctional aromatic amines of the formula (8a), and an aliphatic- or aryl-substituted phthalic anhydride of the formula (8b)

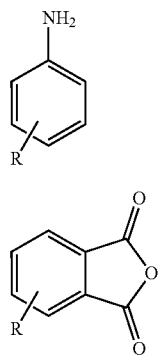

(8a)

(8b)

wherein R is a $C_{1-18}$ linear, branched, or cyclic aliphatic alkyl or alkenyl, or a $C_{6-24}$ monocyclic aryl. In an embodiment, the endcapping agent is not 4-phenylethynylphthalic anhydride. The endcapping agent can be added at any time, e.g., to the polyamine (5), the organic diamine (7), the dianhydride (6), or a combination thereof, before or after the polycondensation reaction has started. In some embodiments, the endcapping agents are mixed with or dissolved into reactants having the similar functionality. For example, monoamine endcapping agents can be mixed with or dissolved into diamines, and monoanhydride can be mixed with or dissolved into dianhydrides.

If an amine-containing endcapping agent is used, the amount can be more than 0 to 10 mol % based on the total amount of dianhydride (6) or (6a). If an anhydride-containing endcapping agent is used, the amount can be in the range of more than 0 to 20 mol %, or 1 to 10 mol % based on the amount of the polyamine (5), preferably (5'), and organic diamine (7) combined. In general, due to the presence of the polyamines, an anhydride-containing endcapping agent is used to decrease the number of amine end groups in the second polyimide and polyetherimide. For example, anhydride-containing endcapping agent can be combined with dianhydride (6) or (6a). Where an anhydride-containing endcapping agent is used, in order to achieve maximum molecular weight, the quantity of amine functionality ([2× diamine moles]+[t×polyamine, moles wherein t is the number of reactive amino groups])=moles of anhydride functionality ([2×dianhydride moles+moles of anhydride in the endcapping agent]). As described above, the stoichiometry condition of the polymerization reaction mixture can be analyzed, and the stoichiometry corrected if needed to provide a stoichiometry within +0.2 mol % of a stoichiometry of 1:1.

A catalyst can be present during imidization. Exemplary catalysts include sodium aryl phosphinates, guanidinium salts, pyridinium salts, imidazolium salts, tetra($C_{7-24}$ arylalkylene) ammonium salts, dialkyl heterocycloaliphatic ammonium salts, bis-alkyl quaternary ammonium salts, ($C_{7-24}$ arylalkylene)($C_{1-16}$ alkyl) phosphonium salts, ($C_{6-24}$ aryl) ($C_{1-16}$ alkyl) phosphonium salts, phosphazenium salts, and combinations thereof. The anionic component of the salt is not particularly limited, and can be, for example, chloride, bromide, iodide, sulfate, phosphate, acetate, maculate, tosylate, and the like. A combination of different anions can be used. A catalytically active amount of the catalyst can be determined by one of skill in the art without undue experimentation, and can be, for example, more than 0 to 5 mol % percent, or 0.01 to 2 mol %, or 0.1 to 1.5 mol %, or 0.2 to 1.0 mol % based on the moles of polyamine (5) or (5') and organic diamine (7).

Conditions effective to provide the branched polyimides are generally known. Polymerization is generally carried out in a solvent, for example relatively non-polar solvents with a boiling point above 100° C., or above 150° C., for example o-dichlorobenzene, dichlorotoluene, 1,2,4-trichlorobenzene, diphenyl sulfone, or a monoalkoxybenzene such as anisole, veratrole, diphenylether, or phenetole. Ortho-dichlorobenzene and anisole can be particularly mentioned. The polymerization is generally at least 110° C., or 150 to 275° C., or 175 to 225° C. for solution polymerization. At temperatures below 110° C., reaction rates may be too slow for economical operation. Atmospheric or super-atmospheric pressures can be used, for example up to 5 atmospheres, to facilitate the use of high temperatures without causing solvent to be lost by evaporation. Effective times depend on the particular reactants and reaction conditions, and can be 0.5 hours to 3 days, for example, generally for 0.5 to 72 hours, preferably 1 to 30 hours, or 2 to 20 hours. Advantageously, the reaction is complete 20 hours or less, preferably 10 hours or less, more preferably 3 hours or less.

It has been found that improved compositions can be obtained by pre-dissolving the polyamine (5), preferably (5'), and the organic diamine (7) before adding the dianhydride (6) or (6a), or before adding the diamine/polyamine to the dianhydride. The catalyst can be added any time during the reaction between the polyamine (5), preferably (5'), and organic diamine (7), and the dianhydride (6) or (6a) continuously or in portions during the course of the reaction. In some embodiments, the catalyst is added after pre-dissolution the polyamine (5), preferably (5'), and organic diamine (7), with the dianhydride (6) or (6a).

A molar ratio of dianhydride (6) or (6a) to a combination of polyamine (5), preferably (5'), and organic diamine (7) of 0.9:1 to 1.1:1, or 1:1 can be used. While other ratios can be used, a slight excess of dianhydride or diamine may be desirable. A proper stoichiometric balance between the dianhydride and combination of polyamine (5), preferably (5'), and organic diamine (7) is maintained to allow for the production of the desired molecular weight of the polymer, or prevent the formation of polymer with significant amounts of amine end groups. Accordingly, in an embodiment, imidization proceeds via forming an initial reaction mixture having a targeted initial molar ratio of dianhydride (6) or (6a) to a combination of polyamine (5), preferably (5'), and organic diamine (7); heating the reaction mixture to a temperature of at least 100° C. to initiate polymerization; analyzing the molar ratio of the heated reaction mixture to determine the actual initial molar ratio of dianhydride (6) or (6a) to polyamine (5), preferably (5'), and organic diamine (7), using, e.g., acid-based titration method, an infrared spectroscopy technique, or proton nuclear magnetic resonance; and, if necessary, adding dianhydride (6) or (6a), or polyamine (5), preferably (5'), or organic diamine (7) to the analyzed reaction mixture to adjust the molar ratio of dianhydride (6) or (6a) to polyamine (5), preferably (5'), and organic diamine (7) to 0.9:1 to 1.1:1.

In other embodiments, the branched polyimide is a branched polyetherimide, and can be synthesized by an ether-forming polymerization, which proceeds via an imidization, i.e., reaction of the polyamine of formula (5), preferably (5'), and the diamine of formula (7) with an anhydride of formula (9)×

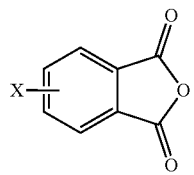

(9)

wherein X is a nitro group or halogen, to provide intermediate bis(phthalimide)s of the formulas (10a) and (10b)

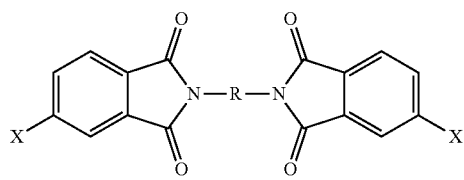

(10a)

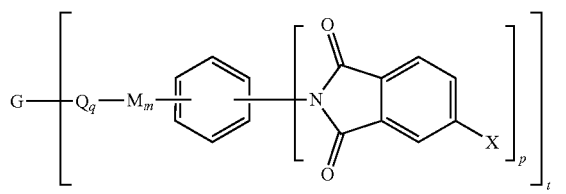

(10b)

wherein G, Q, M, q, m, p, and t are as described in formula (1) and (1a) and X is as described in formula (9). The polyamine (5), preferably (5'), can be present in the reaction in an amount of 0.1 to 20 mol %, or 0.5 to 10 mol %, but preferably 1.0 to 5 mol %, or 1.5 to 4 mol % to achieve increased branching. An optional catalyst or optional end capping agent as described above can be present during imidization.

The bis(phthalimide)s (10a) and (10b) are reacted with an alkali metal salt of a dihydroxy aromatic compound of formula (11)

AMO—Z-OAM    (11)

wherein AM is an alkali metal and Z is as defined above, to provide the branched polyetherimide. Polymerization conditions effective to provide the branched polyimide are generally known, and can be conducted in a solvent as described above. This polymerization can also be conducted in the melt, for example at 250 to 350° C., where a solvent is generally not present.

The first polyimide is generally an unbranched polyimide that comprises more than 1, for example 5 to 1000, or 5 to 500, or 10 to 100, structural units of formula (12)

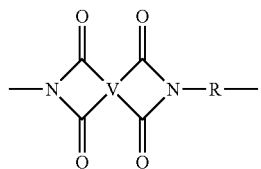

(12)

wherein V and R are as described in formula (1) and (1'). In some embodiments, the first polyimide is a polyetherimide that is generally an unbranched polyetherimide that comprises more than 1, for example 5 to 1000, or 5 to 500, or 10 to 100, structural units of formula (13)

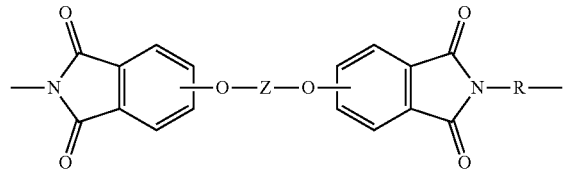

(13)

wherein Z and R are as described in formula (1a) and (1a'). In particular embodiments, the first polyimide has structural units of formula (12) and the second polyimide is of formula (1) or (1'), wherein V and/or R are the same in both the first polyimide and the second polyimide. In another particular embodiment, the first polyimide is a polyetherimide having structural units of formula (13) and the second polyimide is a polyetherimide of formula (1a) or (1a'), wherein Z and/or R are the same in both the first polyimide and the second polyimide.

In some embodiments, the polyimide composition can be prepared by melt processing the first polyimide and the second polyimide using any suitable method. For example, powdered polyimides, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

It is also possible to combine the polyimide composition with an additional polymer that is not the same as the first polyimide or the second polyimide to provide a polymer composition. Such polymer compositions can include 1 to 99 wt % of the polyimide composition and 1 to 99 wt % of the additional polymer, or 10 to 90% of the polyimide composition and 10 to 90 wt % of the additional polymer.

The additional polymer is a thermoplastic. Illustrative examples of the additional polymer include a polyacetal, poly($C_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polysulfone, polybenzothiazole, polybenzoxazole, polybenzimidazole, polycarbonate, polyester, poly($C_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination comprising at least one of the foregoing.

The polyimide composition or the polymer composition can include various additives ordinarily incorporated into compositions of this type, with the proviso that any additive is selected so as to not significantly adversely affect the desired properties of the composition. Exemplary additives include antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame resistances, anti-drip agents, and radiation stabilizers. Other useful additives include carbon nanotubes, exfoliated nanoclays, carbon nanowires, carbon nanospheres, carbon-metal nanospheres, carbon nanorods, carbon-metal nanorods, nanoparticles, or insoluble polymers. Combinations of additives can be used. The foregoing additives can be present individually in an amount from 0.005 to 10 wt %, or combined in an amount from 0.005 to 20 wt %, preferably 0.01 to 10 wt %, based on the total weight of the composition. Particulate fillers and reinforcing fillers can also be present.

Also provided herein is an article including the polyimide composition or the polymer composition. Shaped, formed, or molded articles comprising the polyimide or polymer compositions are also provided. The polyimide or polymer compositions can be molded into useful shaped articles by a variety of methods, such as injection molding, extrusion, rotational molding, blow molding, and thermoforming. A wide variety of articles can manufactured using the polyimide composition or the polymer composition, for example articles of utility in automotive, telecommunication, aerospace, electrical/electronics, battery manufacturing, wire coatings, transportation, food industry, and healthcare applications. Such articles can include films, fibers, foams, thin sheets, small parts, coatings, fibers, preforms, matrices for polymer composites, or the like. The foams can be open or closed cell. In an embodiment the foams are closed cell foams. The articles can be extruded or molded, for example injection molded. Components for electronic devices and components for sterilizable medical articles can be specifically mentioned. Thin-wall components manufactured by injection molding can also be specifically mentioned, such as a wall having a thickness from 0.1 to 10 millimeters (mm), or 0.2 to 5 mm, or 0.5 to 2 mm. In some embodiments, a film can be manufactured by solution-casting or melt processing the polyimide composition or the polymer composition described herein.

The polyimide compositions are further illustrated by the following non-limiting examples.

EXAMPLES

The components in Table 1 were used in the Examples. Unless specifically indicated otherwise, the amount of each component is in wt % in the following examples, based on the total weight of the composition.

TABLE 1

| Material | Description |
|---|---|
| PEI-38k | Polyetherimide made from bisphenol A dianhydride and m-phenylene diamine with phthalic anhydride endcap, Mw = 41,396 g/mol absolute, as determined by triple point detector (SABIC). |
| PEI-33k | Polyetherimide made from bisphenol A dianhydride and m-phenylene diamine with phthalic anhydride endcap, Mw = 33,483 g/mol absolute, as determined by triple point detector (SABIC). |
| BPEI-1 | Polyetherimide made from bisphenol A dianhydride and m-phenylene diamine with phthalic anhydride endcap and 0.3 mol % 1,1,1-tris[4-(4-aminophenoxy)phenyl]ethane (TAPE), Mw = 38,700 g/mol absolute, as determined by triple point detector (SABIC). |
| BPEI-2 | Polyetherimide made from bisphenol A dianhydride and m-phenylene diamine with phthalic anhydride endcap and 0.3 mol % TAPE, Mw = 37,000 g/mol absolute, as determined by triple point detector (SABIC). |
| BPEI-3 | Polyetherimide made from bisphenol A dianhydride and m-phenylene diamine with phthalic anhydride endcap and 1.5 mol % TAPE, Mw = 41,200 g/mol absolute, as determined by triple point detector (SABIC). |
| BPEI-4 | Polyetherimide made from bisphenol A dianhydride and m-phenylene diamine with phthalic anhydride endcap and 1.5 mol % TAPE, Mw = 39,200 g/mol absolute, as determined by triple point detector (SABIC). |

Physical testing of the compositions was conducted according to the following test methods and procedures. Unless indicated otherwise, all test standards set forth herein are the test standards in effect as of 2016.

Weight average molecular weight ($M_w$) was measured by gel permeation chromatography (GPC, EcoSECHLC-8320, Tosoh Bioscience) equipped with a Wyatt MiniDAWN TREOS multi-angle light scattering detector, a differential refractive index detector (DRI), and a UV detector. The PEIs were dissolved in DMF, and the flow rate was 0.5 mL min$^{-1}$. The column set consisting of a SuperH-H guard column (4.6 mm ID×3.5 cm, 4 μm), a SuperH-H guard column (6.0 mm ID×15 cm, 4 μm), and two SuperH-H guard columns (6.0 mm ID×15 cm, 4 μm) carried out the separation. Both the detectors and columns were maintained at 30° C. $M_w$ was determined by a triple point detector.

Polydispersity was determined by size exclusion chromatography-multiple angle light scattering SEC-MALS in chloroform using dn/dc=0.271 or determined by GPC using polystyrene standards (or a triple-point detector).

Differential scanning calorimetry (DSC) was performed under a nitrogen flush of 50 mL/min at a heating rate of 10° C./min on a TA instruments Q1000 DSC, which was calibrated using indium (melting point, m.p.=156.60° C.) and zinc (m.p.=419.47° C.) standards. Glass transition temperature ($T_g$) was measured as the midpoint of the transition in the second heating ramp.

Tensile tests were performed on an Instron 5500R at a cross-head speed of 5 mm/min at 23° C. according to ASTM D638-14. The maximum elongation was averaged over five specimens.

Melt rheological studies were performed on an AR-G2 rheometer (TA Instruments) and two 25-mm-diameter parallel plates were used.

Melt stability studies were performed at 380° C. for 30 minutes under nitrogen on a rheometer with a sandwich, or parallel-late/cone-plate, fixture according to ASTM D4440. Viscosity data (poise=P) was compared between the initial value and 30 minutes (final value). Pellets were dried for approximately 2 to 4 hours at 150° C. prior to testing.

Flammability testing was conducted according to UL 94 regulations. The total flame-out-time was calculated at a thickness of 1.5 mm. For a sample that meets V-2, burning stops within 30 seconds on a vertical specimen; drips of flaming particles are allowed. For a sample that meets V-1, burning stops within 30 seconds on a vertical specimen; drips of particles allowed as long as they are not inflamed. For samples that meet V-0, burning stops within 10 seconds on a vertical specimen; drips of particles allowed as long as they are not inflamed.

The compositions were prepared as follows. The components according to Table 2 were blended in accordance with Table 3, and were then extruded by using a twin extruder. Examples CE1 and CE9 to CE12 had a single component in the compositions. The extruded pellets were molded into standard testing bars for mechanical test. Typical compounding and molding procedures are described as follows.

TABLE 2

|  | Absolute $M_w$ (g/mol) | Absolute $M_n$ (g/mol) | PDI |
|---|---|---|---|
| PEI-38k | 41396 | 18920 | 2.188 |
| PEI-33k | 33483 | 16699 | 2.005 |
| BPEI-1 | 38706 | 15487 | 2.499 |
| BPEI-2 | 36994 | 15078 | 2.453 |
| BPEI-3 | 41193 | 13900 | 2.963 |
| BPEI-4 | 39250 | 13262 | 2.960 |

TABLE 3

|  | Unit | CE1 | CE2 | E3 | E4 | E5 | E6 | E7 | E8 | CE9 | CE10 | CE11 | CE12 |
|---|---|---|---|---|---|---|---|---|---|---|---|---|---|
| PEI-38k | % | — | 12.5 | — | — | — | — | — | — | — | — | — | — |
| PEI-33k | % | 100 | 87.5 | 97.9 | 87.5 | 75 | 95.6 | 89.9 | 83 | — | — | — | — |
| BPEI-1 | % | — | — | — | 6.25 | 12.5 | — | — | — | 100 | — | — | — |
| BPEI-2 | % | — | — | — | 6.25 | 12.5 | — | — | — | — | 100 | — | — |
| BPEI-3 | % | — | — | 1.05 | — | — | 2.2 | 5.05 | 8.5 | — | — | 100 | — |
| BPEI-4 | % | — | — | 1.05 | — | — | 2.2 | 5.05 | 8.5 | — | — | — | 100 |

The extruder type for preparing the samples was a twin-screw, vacuum vented, 30 mm Werner Pfleiderer twin screw extruder with six barrel sections. Extrusion was performed at a barrel temperatures starting at 338° C. (640° F.) and incrementing to reach 360° C. (680° F.) at zone 6, die temperature of 371° C. (700° F.), screw speed of 300 rpm, and output of 40 kilograms per hour (kg/h). Extrusion was run with vacuum venting. The twin-screw extruder had enough distributive and dispersive mixing elements to produce good mixing between the components. The melt processed compositions exited the extruder through small exit holes in a die. The resulting strands of molten resin were cooled by passing the strands through a water bath.

The melt flow properties for the extruded samples are provided in Table 4.

TABLE 4

| Property | Units | CE1 | CE2 | E3 | E4 | E5 | E6 | E7 | E8 | CE9 | CE10 | CE11 | CE12 |
|---|---|---|---|---|---|---|---|---|---|---|---|---|---|
| MFR (337° C.) | g/10 min | 18 | 17 | 20 | 21 | 23 | 19 | 22 | 20 | 13 | 15 | 15 | 19 |
| Apparent Viscosity (640 $s^{-1}$) | Pa · s | 329 | 367 | 309 | 308 | 307 | 306 | 303 | 321 | 631 | 562 | 415 | 387 |
| Viscosity Change (400° C. for 1800 s) | % | 13 | 10 | 15 | 56 | 105 | 20 | 26 | 58 | 168 | 178 | 162 | 586 |

Thermoplastic properties of linear polyetherimides (CE1 and CE2), linear and branched polyetherimide (PEI) blends (E3-E8), and branched PEIs (CE9-CE12) were analyzed and compared. Melt flow rate (MFR) for the PEI blends (E3-E8) were greater than or equal to 19 grams per 10 minutes (g/10 min), as shown in Table 4, even though the individual components had lower MFR values (CE1, CE2, and CE9 to CE12). The MFR for branched PEIs (CE9-CE12) were 13-19 g/10 min, in the same range as the linear PEIs (CE1-CE2).

The apparent viscosities (at a shear rate of 640 $s^{-1}$ and a temperature of 380° C.) for the PEI blends (E3-E8) were less than 330 Pascal·seconds (Pa·s), as shown in Table 4. The apparent viscosities for the branched PEIs (E9-E12) were 380-630 Pa·s, showing higher viscosity than the linear PEIs (CE1-CE2). The results showed that a reduction in apparent viscosity can be obtained by blending linear and branched PEIs.

The viscosity change (after 1,800 seconds at 400° C.) for the PEI blends (E3, E6, and E7) was less than or equal to 26% for the samples prepared with less than 12 wt % of the branched PEIs in the formulation (E3, E6, and E7).

The extruded pellets were molded into shapes suitable for the applicable mechanical testing. The compositions were molded a 180-ton DeMag injection molding machine. Molding used a flat profile at 690° F. with a mold temperature of 300° F. Injection speed was set to 38.1 mm (1.5 inches) per second with a back pressure of 3.4 atm (50 psig). The samples were molded into 3.2 mm ASTM Izod bars and ASTM tensile bars.

The mechanical properties for the extruded samples are provided in Table 5.

TABLE 5

| Property | Units | CE1 | CE2 | E3 | E4 | E5 | E6 | E7 | CE9 | CE10 | CE11 | CE12 |
|---|---|---|---|---|---|---|---|---|---|---|---|---|
| Elongation at Break | % | 38 | 44 | 21 | 35 | 32 | 22 | 50 | 11 | 12 | 12 | 9 |
| Notched Izod Impact Strength | J/m | 30 | 32 | 32 | 34 | 32 | 28 | 31 | — | 28 | 27 | 25 |
| Unnotched Izod Impact Strength | J/m | 1580 | 1550 | 1340 | 1610 | 1310 | 1140 | 1240 | — | 1210 | 1220 | 1050 |
| Reverse Notch Izod Impact Strength | J/m | 1040 | 968 | 904 | 1040 | 874 | 991 | 906 | — | 759 | 634 | 713 |

The tensile elongation at break (at 5 mm/min and 23° C.) for the PEI blends (E3-E7) were greater than those of the branched PEIs (CE9-CE12). The tensile elongation at break for the PEI blends (E3-E7) were at least 21%, whereas the tensile elongation at break for branched PEIs (CE9-CE12) had an average of 11%.

The impact strengths (Notched Izod at 23° C. and 5 lbs./ft) for the PEI blends (E3-E7) were greater than 28 Joules per meter (J/m). The notched Izod impact strengths for the PEI blends (E3-E7) were similar or greater than those for the linear PEIs (CE1 and CE2) as shown in Table 5. The branched PEIs (CE9-CE12) showed an acceptable impact strength of at least 25 J/m. The PEI blends having branched PEIs with lower levels of TAPE had similar properties to the linear PEIs for all types of Izod impact testing.

The thermal and flame retardance properties for the extruded samples are provided in Table 6.

TABLE 6

| | Unit | CE1 | CE2 | E3 | E4 | E5 | E6 | E7 | E8 | CE9 | CE10 | CE11 | CE12 |
|---|---|---|---|---|---|---|---|---|---|---|---|---|---|
| $T_G$-DSC | ° C. | 218 | 220 | 218 | 218 | 217 | 219 | 217 | 217 | 218 | 218 | 216 | 216 |
| UL94 (1.5 mm) | — | V-0 | V-0 | V-0 | V-0 | V-0 | V-0 | V-0 | V-0 | V-0 | V-0 | V-0 | V-0 |

The branched, linear, and blended PEIs had similar glass transition temperatures ($T_G$). Additionally, all samples had UL94 flammability ratings of V-0, showing that the flame retardance was not diminished by the addition of branching PEIs. While performing the flammability tests, it was noted that the shape of the bottom of the flame bar was different depending on the amount of branching in the sample. Increasing amounts of branching produced less deformation or melt flow near the bottom of the flame bar. It is expected that this type of behavior could have significant effects for flame testing of articles that incorporate the blended PEIs.

Overall, the improved flow properties of the branched PEIs were imparted to the PEI blends, while the desirable mechanical properties of the linear PEIs were maintained. These results showed a synergistic interaction between the PEIs in the blend, because the resulting properties were surprisingly better than expected from the aggregate properties of the individual PEI components.

This disclosure is further illustrated by the following aspects, which are non-limiting.

Aspect 1. A polyimide composition comprising: 1 to 99 wt %, preferably 70 to 99 wt %, more preferably 75 to 95 wt % of a first polyimide; and 1 to 99 wt %, preferably 1 to 30 wt %, more preferably 2 to 25 wt % of a second polyimide, wherein the first polyimide and the second polyimide are different, and wherein the polyimide composition has a melt flow rate that is greater than a melt flow rate of the first polyimide and greater than a melt flow rate of the second polyimide, each when measured at 337° C. at a shear load of 6.7 kg, in accordance with ASTM 1238, an apparent viscosity that is less than an apparent viscosity of the first polyimide and less than an apparent viscosity of the second polyimide, each when measured at 380° C. at a shear rate of 640 1/s, in accordance with ISO 11443, and a notched Izod impact strength that is greater than at least one of a notched Izod impact strength of the first polyimide or a notched Izod impact strength of the second polyimide, each when measured at 23° C. in accordance with ASTM D256.

Aspect 2. The polyimide composition of aspect 1, wherein the composition has a melt flow rate of at least 19 g/10 min, preferably at least 20 g/10 min, more preferably at least 21 g/10 min when measured at 337° C. at a shear load of 6.7 kg, in accordance with ASTM 1238; an apparent viscosity of less than 330 Pa·s, preferably less than 320 Pa·s, more preferably less than 310 Pa·s when measured at 380° C. at a shear rate of 640 1/s, in accordance with ISO 11443; and a glass transition temperature of greater than 100° C., preferably greater than 200° C., more preferably greater than 210° C., even more preferably greater than 215° C.

Aspect 3. The polyimide composition of aspect 1 or 2, wherein the composition has at least one of a viscosity change of less than 60%, preferably less than 30%, more preferably less than 25% after 1,800 s at 400° C. at a shear rate of 640 1/s; or a tensile elongation at break of greater than 20%, preferably greater than 25%, more preferably greater than 30%, at 23° C. according to ASTM D638; or a notched Izod impact strength of at least 30 J/m, preferably at least 31 J/m, more preferably at least 32 J/m, at 23° C. according to ASTM D256; or an unnotched Izod impact strength of at least 1,100 J/m, preferably at least 1,200 J/m, more preferably at least 1,300 J/m, at 23° C. according to ASTM D256; or a reverse notched Izod impact strength of at least 850 J/m, preferably at least 875 J/m, more preferably at least 900 J/m, at 23° C. according to ASTM D256.

Aspect 4. The polyimide composition of any one or more of aspects 1 to 3, wherein the first polyimide has a $M_w$ of 28,000 to 60,000 g/mol, preferably 30,000 to 50,000 g/mol, more preferably 32,000 to 45,000 g/mol, the second polyimide has a $M_w$ of 32,000 to 60,000 g/mol, preferably 34,000 to 54,000 g/mol, more preferably 36,000 to 46,000 g/mol, and a PDI of the first polyimide is less than a PDI index of the second polyimide.

Aspect 5. The polyimide composition of any one or more of aspects 1 to 4, wherein the second polyimide is of the formula (1) or (1'), wherein G is a group having a valence of t, present in an amount of 0.1 to 20 mol %, or 0.5 to 10 mol %, or 1.0 to 5 mol %, or 1.5 to 4 mol %, each Q is independently the same or different, and is a divalent $C_{1-60}$ hydrocarbon group, each M is independently the same or different, and is —O—, —C(O)—, —OC(O)—, —OC(O)O—, —NHC(O), —(O)CNH—, —S—, —S(O)—, or —S(O)$_2$—, D is a phenylene, each V is independently the same or different, and is a tetravalent $C_{4-40}$ hydrocarbon group, each R is independently the same or different, and is a $C_{1-20}$ divalent hydrocarbon group, q is 0 or 1, m is 0 or 1, d is 0 or 1, p is 1 or 2, t is 2 to 6, preferably 2 to 4, and each n is independently the same or different, and is 1 to 1,000, preferably 2 to 500, or 3 to 100, provided that the total of all values of n is greater than 4, or greater than 10, or greater than 20, or greater than 50, or greater than 100, or greater than 250.

Aspect 6. The polyimide composition of aspect 5, wherein G is —O— when m is 0, pentavalent P(O), a $C_{6-50}$ hydrocarbon having at least one aromatic group, a $C_{2-20}$ aliphatic group, a $C_{4-8}$ cycloaliphatic group, a $C_{3-12}$ heteroarylene, or a polymer moiety.

Aspect 7. The polyimide composition of aspect 5 or 6, wherein q is 1, Q is a $C_{6-20}$ arylene, m is 1, and M is —O—.

Aspect 8. The polyimide composition of any one or more of aspects 5 to 7 wherein V is a group of the formula (2), wherein W is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof, or a group of the formula —O—Z—O— wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded.

Aspect 9. The polyimide composition of any one or more of aspects 5 to 8, wherein the second polyimide is a branched polyetherimide of the formula (1a) or (1a'), wherein each Z is independently an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded.

Aspect 10. The polyimide composition of aspect 9, wherein Z is a divalent group of the formula (4a), wherein J is a single bond, —O—, —S—, —C(O)—, —SO$_2$—, —SO—, or —C$_y$H$_{2y}$— wherein y is an integer from 1 to 5 or a halogenated derivative thereof, preferably isopropylidene; and R is m-phenylene, p-phenylene, bis(4,4'-phenylene)sulfone, bis(3,4'-phenylene)sulfone, or bis(3,3'-phenylene)sulfone.

Aspect 11. The polyimide composition of any one or more of aspects 5 to 10, comprising 80 to 98 wt % of the first polyimide; and 2 to 20 wt % of the second polyimide, wherein G is present in an amount 0.1 to 5 mole percent.

Aspect 12. A method for the manufacture of the second polyimide of any one or more of aspects 1 to 11, the method comprising reacting a polyamine of the formula (5) or (5') and a diamine of the formula (7) with a dianhydride of the formula (6) or (6a), in a solvent and under conditions effective to provide the second polyimide, wherein G, Q, M, D, R, V, q, m, d, p, and t are as defined in any one or more of aspects 1 to 11.

Aspect 13. A method for the manufacture of the second polyimide of any one or more of aspects 1 to 11, wherein the second polyimide is a polyetherimide, the method comprising: reacting a polyamine of the formula (5) or (5') and a diamine of the formula (7) with an anhydride of the formula (9), wherein X is a nitro group or halogen, to provide intermediate bis(phthalimide)s of the formulas (10a) and (10b); and reacting the bis(phthalimide)s with an alkali metal salt of a dihydroxy aromatic compound having the formula (11), wherein AM is an alkali metal, to provide the branched polyetherimide, wherein G, Q, M, D, R, V, Z, q, m, d, p, and t are as defined in any one or more of aspects 1 to 11.

Aspect 14. The method of aspect 12 or 13, wherein the reaction is conducted in the further presence of an endcapping agent.

Aspect 15. The method of aspect 14, wherein the endcapping agent is phthalic anhydride, an aliphatic- or aryl-substituted phthalic anhydride, aniline, a $C_{1-18}$ linear, branched, or cyclic aliphatic monoamine, or a monofunctional aromatic amine.

Aspect 16. A method for the manufacture of the polyimide composition of any one or more of aspects 1 to 15, comprising melt processing the first polyimide and the second polyimide.

Aspect 17. A polymer composition comprising: the polyimide composition of any one or more of aspects 1 to 11 or made by the method of any one or more of aspects 12 to 15; and an additional polymer different from the first polyimide and second polyimide.

Aspect 18. The polymer composition of aspect 17, wherein the additional polymer is a polyacetal, poly($C_{1-6}$ alkyl)acrylate, polyacrylamide, polyacrylonitrile, polyamide, polyamideimide, polyanhydride, polyarylene ether, polyarylene ether ketone, polyarylene ketone, polyarylene sulfide, polyarylene sulfone, polybenzothiazole, polybenzoxazole, polybenzimidazole, polycarbonate, polyester, polyetherimide, polyimide, poly($C_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination comprising at least one of the foregoing.

Aspect 19. An article comprising the polyimide composition of any one or more of aspects 1 to 11 or made by the method of any one or more of aspects 12 to 15, or the polymer composition of aspect 17 or 18.

Aspect 20. A method for the manufacture of a film, comprising solution-casting or melt processing the polyimide composition of any one or more of aspects 1 to 11, the polyimide composition made by the method of any one or more of aspects 12 to 15, or the polymer composition of aspect 17 or 18.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context. The endpoints of all ranges directed to the same component or property are inclusive and independently combinable. Disclosure of a narrower range or more specific group in addition to a broader range is not a disclaimer of the broader range or larger group. "Combination thereof as used herein means that a combination comprising one or more of the listed items, optionally with one or more like items not listed.

Unless defined otherwise, technical and scientific terms used herein have the same meaning as is commonly understood by one of skill in the art to which this disclosure belongs. A "combination" is inclusive of blends, mixtures, alloys, reaction products, and the like.

As used herein, an unattached line, e.g., "O—" indicates a bond, not a methyl group, which is indicated by "—CH$_3$". The term "hydrocarbyl" and "hydrocarbon" refers broadly to a group comprising carbon and hydrogen, optionally with 1 to 3 heteroatoms, for example, oxygen, nitrogen, halogen, silicon, sulfur, or a combination thereof; the term "aliphatic" means a branched or unbranched, saturated or unsaturated group containing carbon and hydrogen, optionally with 1 to 3 heteroatoms, for example, oxygen, nitrogen, halogen, silicon, sulfur, or a combination thereof; the term "cycloaliphatic" means a saturated or unsaturated group comprising carbon and hydrogen optionally with 1 to 3 heteroatoms, for example, oxygen, nitrogen, halogen, silicon, sulfur, or a combination thereof; "alkyl" means a straight or branched chain, saturated monovalent hydrocarbon group; "alkylene" means a straight or branched chain, saturated, divalent hydrocarbon group; "alkylidene" means a straight or branched chain, saturated divalent hydrocarbon group, with both valences on a single common carbon atom; "alkenyl" means a straight or branched chain monovalent hydrocarbon group having at least two carbons joined by a carbon-carbon double bond; "cycloalkyl" means a non-aromatic monovalent monocyclic or multicyclic hydrocarbon group having at least three carbon atoms, "cycloalkenyl" means a non-aromatic cyclic divalent hydrocarbon group having at least three carbon atoms, with at least one degree of unsaturation; "aryl" and "arylene" means a monovalent group and divalent group respectively containing at least one aromatic ring and optionally a nonaromatic ring, and having only carbon in the ring or rings; "alkylarylene" means an aryl group that has been substituted with an alkyl group as defined above, with 4-methylphenyl being an exemplary alkylarylene group; "arylalkylene" means an alkyl group that has been substituted with an aryl group as defined above, with benzyl being an exemplary arylalkylene group; "heteroaryl" and "heteroarylene" means a monovalent group and divalent group respectively wherein at least one carbon in a ring is replaced by a heteroatom (S, O, P, or N); "acyl" means an alkyl group as defined above with the indicated number of carbon atoms attached through a carbonyl carbon bridge (—C(=O)—); "alkoxy" means an alkyl group as defined above with the indicated number of carbon atoms attached through an oxygen bridge (—O—); and "aryloxy" means an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible provided that the substitutions do not significantly adversely affect synthesis or use of the compound. Exemplary groups that can be present on a "substituted" position include, but are not limited to, cyano; hydroxyl; nitro; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; amino di($C_{1-6}$ or $C_{1-3}$)alkyl; $C_{6-12}$ aryl having at least one aromatic rings (e.g., phenyl, biphenyl, naphthyl, or the like); $C_{7-19}$ arylalkylene having 1 to 3 separate or fused rings and from 6 to 18 ring carbon atoms; or $C_{7-19}$ arylalkyleneoxy having 1 to 3 separate or fused rings and from 6 to 18 ring carbon atoms, with benzyloxy being an exemplary arylalkyleneoxy. When a group is substituted, the indicated number of carbon atoms includes the substituent.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A polyimide composition comprising:
   70 to 99 weight percent of a first polyimide, based on a total weight of the polyimide composition, wherein the first polyimide is a linear polyimide; and
   1 to 30 weight percent of a second polyimide, based on the total weight of the polyimide composition, wherein the second polyimide is a branched polyimide of the formula

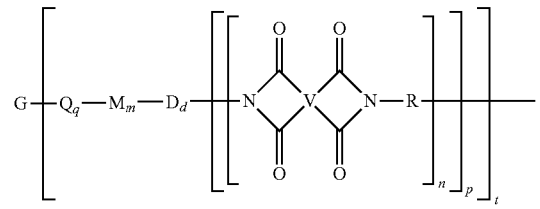

wherein
   the second polyimide is prepared by:
      imidization of:
         a dianhydride, and
         a combination of a polyamine and an organic diamine, or
   the second polyimide is prepared by:
      imidization of
         an anhydride, and
         a combination of a polyamine and an organic diamine to form bis(phthalimide)s, and
      reaction of
         the bis(phthalimide)s, and
         an alkali metal salt of a dihydroxy aromatic compound, wherein the polyamine is present in an amount of 0.1 to 20 mol %, based on total moles of amine functionality of the combination of the polyamine and the organic diamine, G is a group derived from the polyamine, wherein t is 3 to 6, each Q is independently the same or different, and is a divalent $C_{1-60}$ hydrocarbon group comprising carbon and hydrogen, optionally with 1 to 3 heteroatoms, each M is independently the same or different, and is —O—, —C(O)—, —OC(O)—, —OC(O)O—, —NHC(O), —(O)CNH—, —S—, —S(O)—, or —S(O)$_2$—, D is a phenylene, each V is independently the same or different, and is a tetravalent $C_{4-40}$ hydrocarbon group comprising carbon and hydrogen, optionally with 1 to 3 heteroatoms, each R is independently the same or different, and is a $C_{1-20}$ divalent hydrocarbon group comprising carbon and hydrogen, optionally with 1 to 3 heteroatoms, q is 0 or 1, m is 0 or 1, d is 0 or 1, and p is 1 or 2, each n is independently the same or different, and is 1 to 1,000, provided that the total of all values of n is greater than 4, wherein the first polyimide and the second polyimide are different, and wherein the polyimide composition has
a melt flow rate of at least 19 grams per 10 minutes, wherein the melt flow rate is greater than a melt flow rate of the first polyimide and greater than a melt flow rate of the second polyimide, each when measured at 337° C. at a shear load of 6.7 kg, in accordance with ASTM 1238, an apparent viscosity of less than 330 Pascal second, wherein the apparent viscosity is less than an apparent viscosity of the first polyimide and less than an apparent viscosity of the second polyimide, each when measured at 380° C. at a shear rate of 640 inverse seconds, in accordance with ISO 11443, a notched Izod impact strength that is greater than at least one of a notched Izod impact strength of the first polyimide or a notched Izod impact strength of the second polyimide, each when measured at 23° C. in accordance with ASTM D256, and a glass transition temperature of greater than 100° C., as determined by differential scanning calorimetry.

2. The polyimide composition of claim 1, wherein
the melt flow rate is at least 20 grams per 10 minutes when measured at 337° C. at a shear load of 6.7 kg, in accordance with ASTM 1238;
the apparent viscosity is less than 320 Pascal second when measured at 380° C. at a shear rate of 640 inverse seconds, in accordance with ISO 11443;
the notched Izod impact strength of the composition is at least 31 Joules per meter at 23° C. according to ASTM D256; and
the glass transition temperature is greater than 200° C.

3. The polyimide composition of claim 1, wherein the composition has at least one of
a viscosity change of less than 60% after 1,800 seconds at 400° C. and a shear rate of 640 inverse seconds; or
a tensile elongation at break of greater than 20% at 23° C. according to ASTM D638; or
a notched Izod impact strength of at least 30 Joules per meter at 23° C. according to ASTM D256; or an unnotched Izod impact strength of at least 1,100 Joules per meter at 23° C. according to ASTM D256; or
a reverse notched Izod impact strength of at least 850 Joules per meter at 23° C. according to ASTM D256.

4. The polyimide composition of claim 1, wherein
the first polyimide has a weight average molecular weight of 28,000 to 60,000 grams per mole, as measured by gel permeation chromatography using a triple-point detector,
the second polyimide has a weight average molecular weight of 32,000 to 60,000 grams per mole, as measured by gel permeation chromatography using a triple-point detector, and
a polydispersity index of the first polyimide is less than a polydispersity index of the second polyimide, as measured by gel permeation chromatography using a triple-point detector.

5. The polyimide composition of claim 1, wherein in the second polyimide
the polyamine is present in the amount of 0.5 to 10 mol %, based on the total moles of amine functionality of the combination of the polyamine and the organic diamine,
t is 3 or 4, and
the total of all values of n is greater than 10.

6. The polyimide composition of claim 5, wherein G is
a pentavalent P(O),
a $C_{6-50}$ hydrocarbon having at least one aromatic group,
a $C_{2-20}$ aliphatic group,
a $C_{4-8}$ cycloaliphatic group,
a $C_{3-12}$ heteroarylene, or
a polymer moiety.

7. The polyimide composition of claim 5, wherein q is 1, Q is a $C_{6-20}$ arylene, m is 1, and M is —O—.

8. The polyimide composition of claim 5, wherein V is a group of the formula

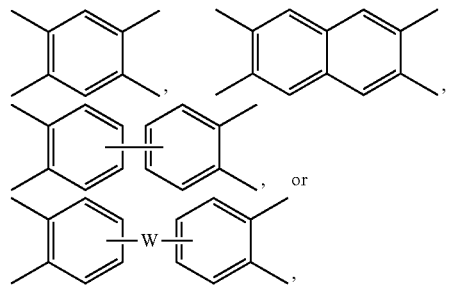

wherein W is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof, or a group of the formula —O—Z—O— wherein Z is an aromatic $C_{6-24}$ monocyclic or polycyclic moiety optionally substituted with 1 to 4 methyl groups, 1 to 3 halogen atoms, or a combination thereof, provided that the valence of Z is not exceeded.

9. The polyimide composition of claim 5, wherein the second polyimide is a branched polyetherimide of the formula

[Structure showing polyimide formula with G—[Qq—Mm—Dd—[N-phthalimide-O—Z—O-phthalimide-N—R]n]p]t]

wherein each Z is independently an aromatic $C_{6-24}$ monocyclic or polycyclic moiety optionally substituted with 1 to 4 methyl groups, 1 or 2 halogen atoms, or a combination thereof, provided that the valence of Z is not exceeded.

10. The polyimide composition of claim 9, wherein Z is a divalent group of the formula

[Structure: —C6H4—J—C6H4—]

wherein
J is a single bond, —O—, —S—, —C(O)—, —SO2—, —SO—, or —$C_yH_{2y}$— wherein y is an integer from 1 to 5 or a halogenated derivative thereof; and
R is m-phenylene, p-phenylene, bis(4,4'-phenylene) sulfone, bis(3,4'-phenylene)sulfone, or bis(3,3'-phenylene)sulfone.

11. The polyimide composition of claim 5, comprising
80 to 98 weight percent of the first polyimide, based on a total weight of the polyimide composition; and
2 to 20 weight percent of the second polyimide, based on a total weight of the polyimide composition,
wherein the polyamine is present in an amount of 0.1 to 5 mole percent, based on the total moles of amine functionality of the combination of the polyamine and the organic diamine.

12. A method for the manufacture of the polyimide composition of claim 1, the method comprising
reacting
a polyamine of the formula G—[Qq—Mm—Dd—[NH2]p]t and a diamine of the formula

H2N—R—NH2 with either
a dianhydride of the formula

[Structure of dianhydride with V group]

or
an anhydride of the formula

[Structure of X-substituted phthalic anhydride]

in a solvent and under conditions effective to provide the second polyimide; and
blending the first polyimide and the second polyimide,
wherein G, Q, M, D, R, V, q, m, d, p, and t are as defined in claim 1, and wherein X is a nitro group or halogen.

13. The method of claim 12, wherein the second polyimide is a polyetherimide, the method comprises:
reacting
the polyamine, having the formula G—[Qq—Mm—C6H4—[NH2]p]t, and the diamine of the formula

H2N—R—NH2 with the anhydride of the formula

[Structure of X-substituted phthalic anhydride]

wherein X is a nitro group or halogen, to provide intermediate bis(phthalimide)s of the formulas

[Structure showing X-substituted bis(phthalimide) with R linker] and

[Structure: G—[Qq—Mm—C6H4—N-phthalimide-X]p]t;

and
further comprising reacting the bis(phthalimide)s with an alkali metal salt of a dihydroxy aromatic compound having the formula

AMO—Z-OAM, wherein AM is an alkali metal, to provide the branched polyetherimide; and blending the first polyimide and the second polyimide, wherein G, Q, M, R, V, Z, q, m, p, and t are as defined in claim 1.

14. The method of claim 12, wherein the reaction is conducted in the further presence of an endcapping agent.

15. The method of claim 14, wherein the endcapping agent is phthalic anhydride, an aliphatic- or aryl-substituted phthalic anhydride, aniline, a $C_{1-18}$ linear, branched, or cyclic aliphatic monoamine, or a monofunctional aromatic amine.

16. The method of claim 12, wherein the blending comprises melt processing the first polyimide and the second polyimide.

17. A polymer composition comprising:
the polyimide composition of claim 1; and
an additional polymer different from the first polyimide and second polyimide.

18. The polymer composition of claim 17, wherein the additional polymer is a polyacetal, poly($C_{1-6}$ alkyl)acrylate, polyacrylamide, polyacrylonitrile, polyamide, polyamide-imide, polyanhydride, polyarylene ether, polyarylene ether ketone, polyarylene ketone, polyarylene sulfide, polyarylene sulfone, polybenzothiazole, polybenzoxazole, polybenzimidazole, polycarbonate, polyester, polyetherimide, polyimide, poly($C_{1-6}$ alkyl)methacrylate, polymethacrylamide, cyclic olefin polymer, polyolefin, polyoxadiazole, polyoxymethylene, polyphthalide, polysilazane, polysiloxane, polystyrene, polysulfide, polysulfonamide, polysulfonate, polythioester, polytriazine, polyurea, polyurethane, vinyl polymer, or a combination thereof.

19. The polyimide composition of claim 1, comprising 75 to 95 weight percent of the first polyimide, based on a total weight of the polyimide composition; and 2 to 25 weight percent of the second polyimide, based on a total weight of the polyimide composition.

20. The polyimide composition of claim 1, wherein at least one of
the apparent viscosity changes by less than 25% after 1,800 seconds at 400° C. and a shear rate of 640 inverse seconds, as compared to an initial apparent viscosity when measured at 380° C. at a shear rate of 640 inverse seconds, in accordance with ISO 11443; or
the tensile elongation at break is greater than 30% at 23° C. according to ASTM D638; or
the unnotched Izod impact strength is at least 1,300 Joules per meter at 23° C. according to ASTM D256; or
the reverse notched Izod impact strength is at least 900 Joules per meter at 23° C. according to ASTM D256.

\* \* \* \* \*